Patented Feb. 8, 1944

2,341,186

UNITED STATES PATENT OFFICE 2,341,186

LUBRICATED VINYL AROMATIC RESIN AND PREPARATION OF SHAPED ARTICLES THEREFROM

Lorne A. Matheson and Raymond F. Boyer, Midland, Mich., assignors to The Dow Chemical Company, Midland, Mich., a corporation of Michigan No Drawing. Application March 13, 1940, Serial No. 323,790

14 Claims. (Cl. 260—23)

This invention concerns certain vinyl aromatic resin compositions which comprise a lubricant to facilitate their removal from molds and it also concerns the preparation of such compositions, particularly in shaped or molded form.

The expression "vinyl aromatic resin" refers generically to the solid resinous polymers of vinyl aromatic compounds such as styrene, ortho-chloro styrene, meta-chloro styrene, para-chloro styrene, ortho-methyl styrene, ortho-ethyl styrene, meta-ethyl styrene, para-ethyl styrene, divinyl benzene, vinyl naphthalene, etc., and their copolymers with other unsaturated organic compounds such as di-allyl maleate, tung oil, etc.

The vinyl aromatic resins are clear, transparent glass-like materials of high luster and they are useful in preparing a wide variety of shaped articles such as optical lenses, toilet articles, etc., which are dependent for value upon the possession of such properties. The articles are prepared either by polymerizing a vinyl aromatic compound within a mold to obtain directly a resinous product of desired form or by molding the unshaped resin after its formation by polymerization.

Certain difficulties are encountered in manufacturing shaped articles of the vinyl aromatic resins by either of these methods. The articles frequently adhere tightly to the molds in which they are formed and surface marring often occurs during their removal from the molds. Accordingly, the proportion of imperfect molded products, or discards, is usually high. Also, the molded products gradually develop a yellowish tint upon prolonged exposure to light and air, thus restricting their utility for some purposes. An object of this invention is to provide certain new vinyl aromatic resin compositions which comprise a lubricant to facilitate their removal from molds used in shaping them. Another object is to provide such compositions which, in addition to being self-lubricating, are also colorless, transparent and more resistant to discoloration by light and air than are the corresponding vinyl aromatic resins alone. A further object is to provide a method of preparing the new compositions, particularly as finished articles of desired shape. Other objects will be apparent from the following description of the invention.

We have found that amino fatty acids or the ammonia or amine salts of fatty acids may be incorporated in the vinyl aromatic resins to obtain clear transparent moldable compositions and that when so incorporated they serve as lubricants to facilitate withdrawal of the compositions from molds in which they are shaped. We have further found that in most instances these fatty acid derivatives also stabilize the resins against discoloration by light or air. The agents may advantageously be derivatives of fatty acids containing 5 or more carbon atoms to the molecule, e. g. derivatives of valeric acid, caproic acid, etc. They preferably are derivatives of higher fatty acids, i. e. of fatty acids containing 10 or more carbon atoms, since the lubricating properties of such derivatives usually improve as the number of carbon atoms in the acid radical is increased up to 10 or higher. Examples of suitable derivatives of the higher fatty acids are amino-stearin (i. e. a mixture of amino-palmitic acid and amino-stearic acid); amino-derivatives of other fatty acids such as margaric acid, dicetyl-acetic acid, myristic acid, etc.; ammonium oleate; ammonium stearate; ammonium palmitate; ammonium laurate; ethylamine oleate; diethylamine oleate; triethylamine oleate; diethylamine stearate; dibutylamine oleate; ethanol-amine oleate; N.N-diethyl-cyclohexylamine stearate; diethanol-amine oleate; triethanol-amine oleate; triethanol-amine abietate; triethanol-amine stearate; triethanol-amine linoleate; morpholine oleate; morpholine stearate; morpholine linoleate; morpholine palmitate; morpholine abietate; etc. The morpholine salts of the fatty acids are particularly effective both as lubricants and as stabilizing agents for the resins and are preferred.

Any of the foregoing fatty acid derivatives may be incorporated with vinyl aromatic resin in any proportion which forms a solid composition even though it may be only partially compatible with the resin when used in the higher proportions, but it preferably is used in small proportions within the limits of its compatibility with the resin. Usually, we incorporate with the resin less than 5.0 per cent and preferably between 0.001 and 0.1 per cent by weight of the fatty acid derivative.

The fatty acid derivative is preferably dissolved in a vinyl aromatic compound prior to polymerizing the latter to form a resin. This method of adding the fatty acid derivative is advantageous in that it produces a uniform composition and it also permits the polymerization to be carried out in a mold so as to obtain directly resinous products of desired shape. However, the fatty acid derivative may be incorporated with the resin in other ways, if desired. For instance it may be added to a comminuted body of the resin and the mixture be passed through heated rolls to obtain a uniform composition or the fatty acid derivative may be added to a solution of the resin in a volatile solvent such as benzene and the solvent thereafter be evaporated to leave the resin composition. The resultant resin composition is a thermoplastic material which may be compression molded or injection molded in accordance with usual procedure to obtain resinous articles of desired shape. Due to the lubricating properties of the fatty acid derivative present in the composition, the molded articles may ordinarily be removed from the mold without difficulty or marring of their surfaces.

Shaped articles of the vinyl aromatic resin compositions prepared as just described are clear, colorless, and transparent and possess a high luster. They also are, in most instances, exceptionally resistant to discoloration by light or air. It will be understood that when desired other substances such as dyes, pigments, fillers, antioxidants, light stabilizing agents, plasticizers, etc., may be incorporated in the compositions prior to shaping or molding the latter so as to modify the properties or the color of the molded products.

The following table decribes a number of vinyl aromatic resin compositions prepared in accordance with the invention and gives the transparency before and after prolonged exposure to artificial sunlight of test plates of the resin compositions. For purpose of comparison, data on a similar test using a plate of pure polystyrene is included. All of the test plates were of the same thickness. The procedure in preparing each test plate was to add to styrene the addition agent stated in the table in the proportion also given and to polymerize the mixture by heating it at a temperature of 125° C. for 7 days and then at 150° C. for 2 days. The polymerized product was molded at a temperature of 160° C. to form the test plate. The plate of pure polystyrene was prepared by polymerizing styrene in accordance with the time-temperature schedule just given and molding the polymer at a temperature of 160° C. The plates containing the addition agents showed less tendency to stick to the mold than did that of pure polystyrene. The light used in testing the stability of the plates was generated by a carbon electrode lamp and was rich in ultra-violet light. Its intensity was such that the discoloration of pure polystyrene resulting from 400 hours of exposure to the lamp corresponded approximately to the discoloration which polystyrene undergoes as a result of one year of exposure to ordinary daylight in the northern part of the United States. The procedure in measuring the transparency of the plates before and after such prolonged exposure to the light consisted in passing ultra-violet light having an average wave length of 3650 Angstrom units into each plate and measuring the intensity of the light entering each plate and the intensity of the light transmitted through the plate. From this data, the per cent of the light transmitted through the plate was calculated in accordance with the formula:

$$\text{Percent light transmission} = 100 \left[ \frac{\text{intensity of light transmitted through plate}}{\text{intensity of light entering plate}} \right]$$

The table gives the identity and the per cent by weight concentration of the lubricant addition agent in each test plate containing such agent and it also gives the transparency of each plate before exposure to the arc lamp and after 400 hours of exposure to the lamp.

Table

| Test No. | Addition agent | | Ultra-violet light transmission | |
|---|---|---|---|---|
| | Name | Percent | Before exposure | After exposure |
| 1 | None | | 88 | 23 |
| 2 | Morpholine palmitate | 1.0 | 66 | 80 |
| 3 | Morpholine linoleate | 1.0 | 66 | 78 |
| 4 | Morpholine oleate | 1.0 | 69 | 78 |
| 5 | Morpholine abietate | 1.0 | 55 | 76 |
| 6 | Morpholine stearate | 1.0 | 70 | 70 |
| 7 | Triethanol amine linoleate | 1.0 | 78 | 54 |
| 8 | Dibutyl amine oleate | 1.0 | 82 | 51 |
| 9 | Amino stearin | 1.0 | 60 | 47 |
| 10 | Triethanol amine oleate | 1.0 | 66 | 44 |
| 11 | Ammonium laurate | 1.0 | 70 | 42 |
| 12 | Morpholine oleate | 0.1 | 83 | 66 |
| 13 | Morpholine abietate | 0.1 | 77 | 62 |
| 14 | Morpholine palmitate | 0.1 | 74 | 56 |
| 15 | Morpholine linoleate | 0.1 | 84 | 54 |
| 16 | Morpholine stearate | 0.1 | 82 | 52 |
| 17 | Triethanol amine stearate | 0.1 | 85 | 41 |
| 18 | Triethanol amine abietate | 0.1 | 84 | 41 |
| 19 | Triethanol amine linoleate | 0.1 | 86 | 41 |
| 20 | Triethanol amine oleate | 0.1 | 82 | 38 |
| 21 | Ammonium laurate | 0.1 | 85 | 34 |
| 22 | Dibutyl amine oleate | 0.01 | 90 | 43 |
| 23 | Triethanol amine abietate | 0.01 | 86 | 42 |
| 24 | Triethanol amine oleate | 0.01 | 87 | 40 |

From the table it will be seen that each test plate which contained one of the addition agents was more transparent than the plate of polystyrene alone after exposure to the arc lamp. In most instances the transparency of the plates decreased as a result of the exposure, but in some instances the exposure to light caused an increase in the transparency of the plates. The usual decrease in transparency following exposure to light is due to development of color (usually yellow) in the sample. The intensity of the color is, roughly, inversely proportionate to the light transmission figures given. In those instances in which the transparency increased under prolonged exposure to light, the increase in transparency did not appear to involve any color change. Instead, the compositions which displayed this phenomena were clear, colorless, and transparent both before and after the exposure to light. Apparently the addition agents used in such compositions absorb ultra-violet light and thus reduce the amount of light transmitted through the samples at the start of the test. However, as the exposure to light is prolonged the addition agent loses its property of absorbing light with the result that the transparency (i. e. ability to transmit light) of the composition increases. Although applicants believe this to be the explanation of increased transparency due to exposure to light, the invention is not restricted by this theory. It will be noted that the morpholine salts of fatty acids were particularly effective agents for stabilizing the polymer against discoloration by light. They are also effective lubricants for the vinyl aromatic resin compositions comprising them, and greatly facilitate the removal of such compositions from molds in which they are shaped.

Other modes of applying the principle of the invention may be employed instead of those explained, change being made as regards the method or compositions herein disclosed, provided the steps or ingredients stated by any of the following claims or the equivalent of such stated steps or ingredients be employed.

We therefore particularly point out and distinctly claim as our invention:

1. The method of stabilizing a vinyl aromatic resin against discoloration by light and at the same time lubricating the resin to facilitate its removal from molds used to shape it, which comprises incorporating with the resin a small proportion of a morpholine salt of a fatty acid having at least 5 carbon atoms in the acid radical.

2. The method of stabilizing polystyrene against discoloration by light and at the same time lubricating it to facilitate its removal from molds, which comprises incorporating with the polystyrene a small proportion of a morpholine salt of a higher fatty acid, containing at least 10 carbon atoms in the acid radical.

3. The method which comprises adding to a liquid polymerizable vinyl aromatic compound a small proportion of a morpholine salt of a higher fatty acid, containing at least 10 carbon atoms in the acid radical, and polymerizing the mixture to form a resin composition which is solid at room temperature.

4. The method which comprises adding to styrene a small proportion of a morpholine salt of a higher fatty acid, containing at least 10 carbon atoms in the acid radical, and thereafter polymerizing the styrene, whereby a stabilized resin composition is formed which is self lubricating as regards its withdrawal from molds used to shape it.

5. A plastic composition comprising a vinyl aromatic resin and, as a stabilizer therefore and a lubricant for facilitating withdrawal of the composition from molds, a small proportion of a compound selected from the class consisting of ammonium, amine, and amino derivatives of fatty acids having at least 5 carbon atoms in the acid radical incorporated therewith.

6. A plastic composition comprising polystyrene and, as a stabilizer therefore and a lubricant for facilitating its withdrawal from molds, a small proportion of an amine salt of a higher fatty acid, containing at least 10 carbon atoms in the acid radical, incorporated therewith.

7. A composition comprising a substance selected from the class consisting of liquid vinyl aromatic compounds and their solid polymers having a small proportion of a morpholine salt of a higher fatty acid, containing at least 10 carbon atoms in the acid radical, incorporated therewith.

8. A plastic composition comprising polystyrene and a small proportion of a morpholine salt of a higher fatty acid, containing at least 10 carbon atoms in the acid radical, incorporated therewith.

9. A plastic composition comprising a vinyl aromatic resin and a small proportion of morpholine palmitate incorporated therewith.

10. A plastic composition comprising polystyrene and a small proportion of morpholine palmitate incorporated therewith.

11. A plastic composition comprising a vinyl aromatic resin and a small proportion of morpholine linoleate incorporated therewith.

12. A plastic composition comprising polystyrene and a small proportion of morpholine linoleate incorporated therewith.

13. A plastic composition comprising a vinyl aromatic resin and a small proportion of morpholine oleate incorporated therewith.

14. A plastic composition comprising polystyrene and a small proportion of morpholine oleate incorporated therewith.

LORNE A. MATHESON.
RAYMOND F. BOYER.